US011582211B1

(12) United States Patent
Moritz

(10) Patent No.: US 11,582,211 B1
(45) Date of Patent: *Feb. 14, 2023

(54) TRANSMITTING CONTENT TO PROMOTE PRIVACY

(71) Applicant: BlueRISC, Inc., Amherst, MA (US)

(72) Inventor: Csaba Andras Moritz, Amherst, MA (US)

(73) Assignee: BLUERISC, INC., Amherst, MA (US)

( * ) Notice: Subject to any disclaimer, the term of this patent is extended or adjusted under 35 U.S.C. 154(b) by 356 days.

This patent is subject to a terminal disclaimer.

(21) Appl. No.: 16/682,859

(22) Filed: Nov. 13, 2019

Related U.S. Application Data

(63) Continuation of application No. 16/248,395, filed on Jan. 15, 2019, now Pat. No. 10,516,524, which is a continuation of application No. 15/236,970, filed on Aug. 15, 2016, now Pat. No. 10,225,075.

(51) Int. Cl.
| | |
|---|---|
| *H04L 9/40* | (2022.01) |
| *H04L 9/32* | (2006.01) |
| *H04L 9/08* | (2006.01) |
| *H04L 9/06* | (2006.01) |
| *H04L 9/14* | (2006.01) |

(52) U.S. Cl.
CPC ............ *H04L 63/06* (2013.01); *H04L 9/0625* (2013.01); *H04L 9/0827* (2013.01); *H04L 9/0861* (2013.01); *H04L 9/0894* (2013.01); *H04L 9/14* (2013.01); *H04L 9/32* (2013.01); *H04L 9/3226* (2013.01); *H04L 63/0428* (2013.01); *H04L 63/062* (2013.01)

(58) Field of Classification Search
CPC ... H04L 63/06; H04L 63/0428; H04L 63/062; H04L 9/0625; H04L 9/0827; H04L 9/0861; H04L 9/0894; H04L 9/14; H04L 9/32; H04L 9/3226
See application file for complete search history.

(56) References Cited

U.S. PATENT DOCUMENTS

| | | | |
|---|---|---|---|
| 6,609,201 | B1 | 8/2003 | Folmsbee |
| 6,970,985 | B2 | 11/2005 | Moritz |
| 7,493,607 | B2 | 2/2009 | Moritz |
| 8,327,249 | B2 | 12/2012 | Jorda et al. |
| 8,607,209 | B2 | 12/2013 | Chheda et al. |
| 9,411,964 | B1 | 8/2016 | Moritz et al. |
| 9,467,425 | B2 | 10/2016 | Epp et al. |
| 9,754,112 | B1 | 9/2017 | Mortiz et al. |
| 2002/0016910 | A1 | 2/2002 | Wright |
| 2003/0167314 | A1 | 9/2003 | Gilbert |
| 2005/0114850 | A1 | 5/2005 | Chheda et al. |

(Continued)

OTHER PUBLICATIONS

Aho, A. V. et al., Compilers—Principles, Techniques, and Tools; Addison-Wesley, Reading, MA (1986).

(Continued)

*Primary Examiner* — Theodore C Parsons
(74) *Attorney, Agent, or Firm* — Burns & levinson LLP

(57) ABSTRACT

An example process includes breaking content into multiple fragments; and transmitting at least two of the multiple fragments over different physical channels in order to isolate the at least two fragments during transmission. The example process may include generating session keys; encrypting at least some of the fragments using different session keys; and associating, with each fragment, a session key used to encrypt a different fragment to produce fragment/session key pairs.

30 Claims, 5 Drawing Sheets

(56) References Cited

U.S. PATENT DOCUMENTS

| | | |
|---|---|---|
| 2007/0044153 A1 | 2/2007 | Schuba et al. |
| 2007/0260693 A1 | 11/2007 | Cardone |
| 2007/0294181 A1 | 12/2007 | Chheda et al. |
| 2008/0034355 A1 | 2/2008 | Shen et al. |
| 2008/0126766 A1 | 5/2008 | Chheda et al. |
| 2008/0276227 A1 | 11/2008 | Greifeneder |
| 2010/0070781 A1 | 3/2010 | Gustave |
| 2010/0150341 A1 | 6/2010 | Dodgson |
| 2013/0205285 A1 | 8/2013 | Pizlo |
| 2015/0237016 A1 | 8/2015 | Sao |

OTHER PUBLICATIONS

Alternative to itoa() for converting integer to string C++?, 8 pages (Oct. 23, 2008). URL: http://stackoverflow.com/questions/228005/alternative-to-itoa-for-converting-integer-to-string-c [Retrieved June 21, 2016].

Anderson, R, and Kuhn, M., Tamper Resistance—A Cautionary Note, Proceedings of Second USENIX Workshop on Electronic Commerce, (1996).

Brumley, D. et al., Sting: An Eno-End Self-Healing System for Defending against Internet Worms, 31 pages (Nov. 2005). URL: http://www.cs.berkeley.edu/~dawnsong/papers/2007%20sting-bookchapter-06.pdf [Retrieved Feb. 19, 2016].

Coppola, M., Owning the Network: Adventures in Router Rootkits, Virtual Security Research, LLC. (2012).

Cui, A. and Stolfo, S., Defending Legacy Embedded Systems with Software Symbiotes, the 14th International Symposium on Recent Advances in Intrusion Detection (RAID), 358-377 (2011).

Department of Homeland Security, Critical Infrastructure Sectors, 4 pages (2016). URL: http://www.dhs.gov/criticalinfrastructure-sectors [Retrieved Jun. 21, 2016].

Diskin, G., Binary Instrumentation for Security Professionals, Intel, Blackhat USA (2011).

File History of U.S. Appl. No. 14/551,341, filed Nov. 24, 2014 (Retrieved Jan. 30, 2017).

File History of U.S. Appl. No. 14/551,508, filed Nov. 24, 2014 (Retrieved Jan. 30, 2017).

File History of U.S. Application 15/193,935, filed Jun. 27, 2016 (Retrieved Jan. 30, 2017).

Gartner, Gartner Says Internet of Things Installed Base Will Grow to 26 Billion Units by 2020, 4 pages (Dec. 12, 2013). URL: http://www.design-reuse.com/news/33491/gartner-internet-of-things.html [Retrieved Feb. 19, 2016].

Gilmont, T. et al., Hardware security for software privacy support, Electronics Letters, 35(24):2096-2097 (1999).

Jenei, S., Anti-Stacking Provisions Can Help Minimize Total Royalty Burden, 3 pages (Mar. 10, 2006). URL: http://www.patentbaristas.com/archives/2006/03/10/anti-stacking-provisions-can-help-minimize-total-royalty-burden, [Retrieved Feb. 19, 2016].

Jha, S., Software Security Issues in Embedded Systems, 2 pages. http://www.cs.wisc.edu/~jha [Retrieved Feb. 19, 2016].

Kean, T., Secure Configuration of Field Programmable Gate Arrays, Proceedings of the 11th International Conference on Field-Programmable Logic and Applications, 19 pages (2001).

Kerner, S.M., Network Equipment Market Growing to 551 Billion by 2015, 2 pages (May 11, 2011). URL: http://www.internetnews.com/infra/article.php/3933236/Network+Equipment+Market+Growing+to+51+Billion+by+2015.htm [Retrieved Feb. 19, 2016].

Kolodgy, C.J., Market Analysis: Worldwide Security and Vulnerability Management 2011-2015 Forecast and 2010 Vendor Shares, 1: 31 pages (Aug. 2013). URL: http://www.qualys.com/docs/idc_VM_forecast2012.pdf [Retrieved Feb. 19, 2016].

Kommerling, O. and Kuhn, M.G., Design Principles for Tamper-Resistant Smartcard Processors, USENIX Workshop on Smartcard Technology, 13 pages (1999).

Lie, D., Architectural support for copy and tamper resistant software, Proceedings of the 6th International Conference Architectural Support for Programming Languages and Operating Systems, 10 pages (2000).

Messerges, T.S. et. al., Examining Smart Card Security under the threat of Power Analysis, IEEE Transactions on Computers, 51(5):541-552 (2002).

MTC Group LTD., Morpher-Crypt the Script, 3 pages (May 14, 2010). URL: http://morpher.com [Retrieved Jun. 21, 2018].

Non Final Rejection for U.S. Appl. No. 14/551,341, 7 pages (dated Nov. 2, 2016).

Open Wrt Attitude Adjustment Router Firmware, 3 pages (2016). URL: https://dev.openwrt.org/log/branches/attitude_adjustment [Retrieved Feb. 19, 2016].

Pranith, D.K., et al., Hybrid Analysis of Executables to Detect Security Vulnerabilities, Proceedings of the 2nd India Software Engineering Conference, 141-142 (2009).

Reeves, J., Autoscopy Jr.: Intrusion Detection for Embedded Control Systems, Dartmouth Computer Science Technical Report TR2011-704, 97 pages (Aug. 2011).

Research and Markets: Industrial Control Systems (ICS) Security Market—Global Advancements, Market Forecast Analysis (2013-2018), 5 pages (Nov. 19, 2013).

Schwarz, B. et al., Disassembly of executable code revisited, IEEE Working Conference on Reverse Engineering, 10 pages (2002).

Skorobogatov, S., Breaking Copy Protection in Microcontrollers, 13 pages (2001). URL: http//:www.cl.cam.ac.uk/~sps32/mcu_lock.html [Retrieved May 12, 2016].

Skorobogatov, S., Tamper Resistance and Physical Attacks, ECRYPT 2006 Summer School on Cryptology, 68 pages (2006).

Slobojan, R., Critical Security Vulnerability Found in QuickSort, 4 pages (Apr. 1, 2009). URL: http://wvvw.infoq.com/news/2009/04/quicksort-security-vulnerability [Retrieved Feb. 19, 2016].

Srivastava, A. and Eustace, A., Atom: A system for building customized program analysis tools, Proceedings of the ACM SIGPLAN 94 Conference on Programming Language Design and Implementation, 196-205 (1994).

Vinciguerra, L. et al., An experimentation framework for evaluating disassembly and decompilation tools for C++ and Java, IEEE Working Conference on Reverse Engineering, 14-23 (2003).

Weinghart, S.H., Physical Security Devices for Computer Subsystems: A Survey of Attacks and Defenses, Workshop on Cryptographic Hardware and Embedded Systems—CHES2000, 302-317 (2000).

Non-Final Rejection for U.S. Appl. No. 15/236,999, 27 pp. (dated Jun. 29, 2018).

TRANSMITTING CONTENT TO PROMOTE PRIVACY

CROSS-REFERENCE TO RELATED APPLICATIONS

This application is a continuation of U.S. patent application Ser. No. 16/248,395 which was filed on Jan. 15, 2018 and which is currently pending and allowed; U.S. patent application Ser. No. 16/248,395 being a continuation of U.S. patent application Ser. No. 15/236,970 which was filed on Aug. 15, 2016 and which issued as U.S. Pat. No. 10,225,075 on Mar. 5, 2019. As a continuation of U.S. patent application Ser. No. 16/248,395, this application claims the benefit of priority to U.S. patent application Ser. No. 16/248,395 and to U.S. patent application Ser. No. 15/236,970. The disclosures of U.S. patent application Ser. No. 16/248,395 and U.S. patent application Ser. No. 15/236,970 are incorporated by reference herein.

TECHNICAL FIELD

This disclosure relates generally to transmitting content to promote privacy thereof.

BACKGROUND

Digital encryption technology can prevent unauthorized access to plain (e.g., non-encrypted) versions of content. However, digital encryption technology alone can prove lacking, particularly when faced with third parties who are resourceful and bent on obtaining unauthorized access to user content.

SUMMARY

An example process includes breaking content into multiple fragments; and transmitting at least two of the multiple fragments over different physical channels in order to isolate the at least two fragments during transmission. The example process may include one or more of the following features, either alone or in combination.

Breaking and transmitting may be performed at a sender device, and the sender device may be authenticated prior to breaking the content into multiple fragments. The example process may include generating session keys; encrypting at least some of the fragments using different session keys; and associating, with each fragment, a session key used to encrypt a different fragment to produce fragment/session key pairs. Transmitting may include transmitting the fragment/session key pairs over different physical channels.

The example process may include obtaining one or more keys from one or more key providers; and encrypting each of the session keys with the one or more keys to produce encrypted session keys. A session key associated with each fragment is an encrypted session key. The one or more key providers may be accessible to a sender of the content to obtain the one more keys to encrypt each of the session keys, and may be accessible to a recipient of the content to obtain one or more keys to decrypt the each of the session keys.

The different physical channels may be implemented by different electronic mail providers. The different physical channels may be implemented by resolving a virtual privacy address into a physical e-mail address. The different physical channels may be implemented by different cloud storage service providers. The content may be, or comprise, social media content.

An example process includes receiving fragments of content over different physical channels that isolate at least two fragments during transmission; performing an authentication following receipt of the fragments; and following authentication, reassembling the fragments to produce an assembled version of the content. The example process may include one or more of the following features, either alone or in combination.

Each of the fragments may include a session key used to encrypt another of the fragments; and reassembling may include decrypting fragments using the session keys. Each of the session keys may be encrypted using a key available from a key provider; authentication may be performed with the key provider. The process may also include: receiving the key from the key provider; and decrypting the session keys using the key.

The different physical channels may be implemented by different electronic mail providers. The different physical channels may be implemented by resolving a virtual privacy address into a physical e-mail address. The different physical channels may be implemented by different cloud storage service providers. The content may be, or include, social media content.

An example process includes encrypting content using one or more keys to produce encrypted content; sending at least some of the encrypted content over a first channel to a recipient; and sending at least some of the one or more keys over a second channel to the recipient. The first channel may be different from the second channel. The example process may include one or more of the following features, either alone or in combination.

Encrypting the content may include breaking content into multiple fragments, with different ones of the fragments being encrypted with different keys to produce encrypted fragments comprising the encrypted content. Sending at least some of the encrypted content over the first channel may include sending at least some of the encrypted fragments over the first channel. Sending at least some of the one or more keys over the second channel may include sending at least some of the different keys over the second channel. The example process may include sending at least some of the encrypted fragments over one or more third channels, with the one or more third channels being different from the first channel; and sending at least some of the different keys over one or more fourth channels, with the one or more fourth channels being different from the second channel, and with the first channel and the one or more third channels being isolated from the second channel and the one or more fourth channels.

The one or more keys may comprise session keys generated by the one or more processing devices. The example process may include encrypting the one or more keys using information from a third party provider system prior to sending the at least some of the one or more keys over the second channel. The information from the third party provider system may be accessible to the recipient to decrypt encrypted versions of the at least some of the one or more keys.

Two or more of the features described in this disclosure, including those described in this summary section, may be combined to form implementations not specifically described herein.

The various systems described herein, or portions thereof, may be implemented via a computer program product that includes instructions that are stored on one or more non-transitory machine-readable storage media, and that are executable on one or more processing devices (e.g., microprocessor(s), application-specific integrated circuit(s), programmed logic such as field programmable gate array(s), or the like). The systems described herein, or portions thereof, may be implemented as an apparatus, method, or electronic system that may include one or more processing devices and computer memory to store executable instructions to implement control of the stated functions.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Figure 1:
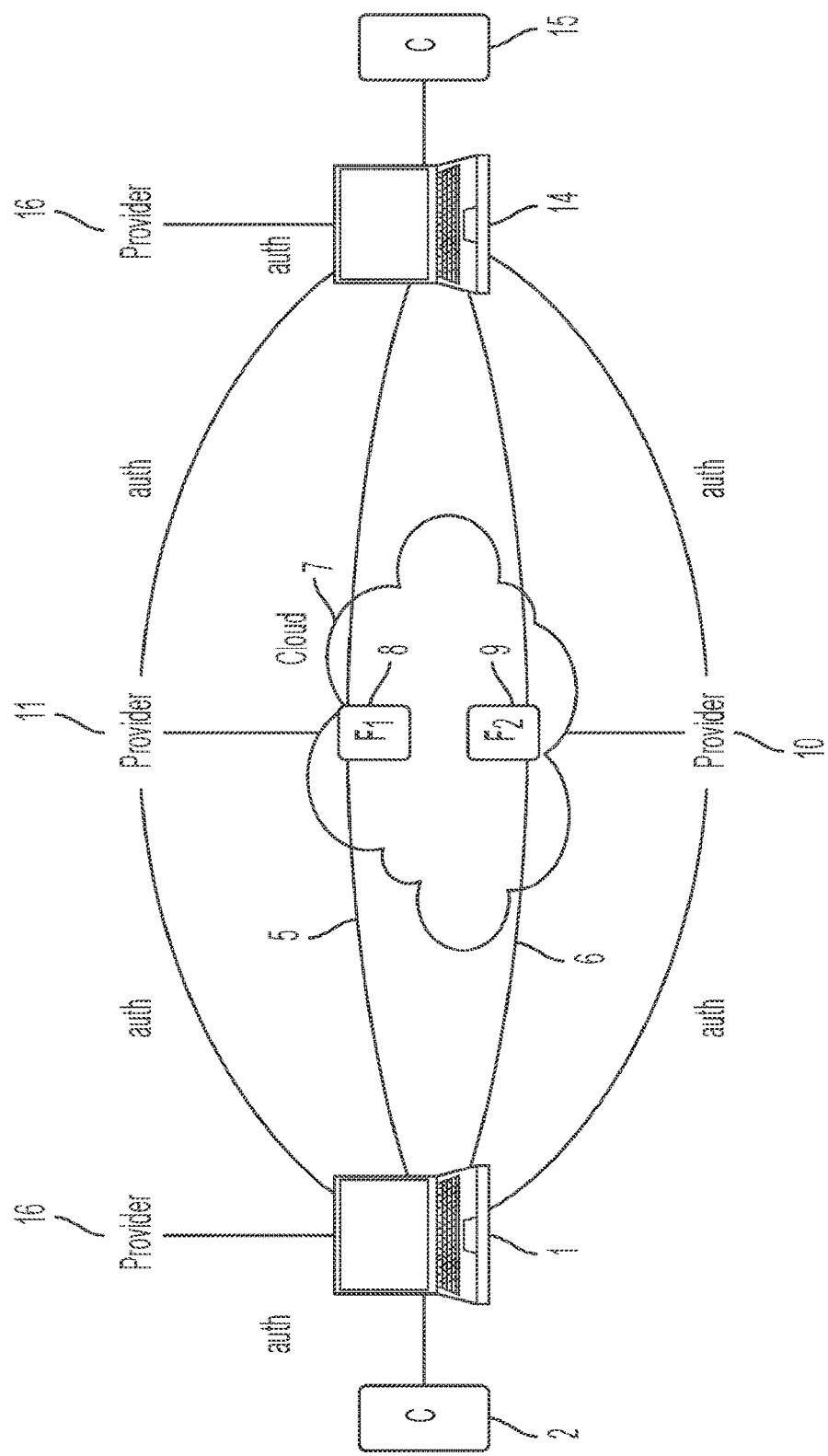
FIG. 1 is block diagram of an example system for transmitting content fragments that are physically isolated.

Described herein are example processes for promoting content (e.g., data) privacy by combining physical separation with digital encryption technology. Examples of physical separation are described herein, although the processes are not limited to use with those examples. Physical separation can protect content privacy even if digital approaches (e.g., encryption technology) to securing content falter. In some examples, physical separation may be used alone (e.g., without digital encryption technology) to promote content privacy.

The example processes may employ various types of digital encryption technology ("encryption"). In some examples, encryption includes processes to obfuscate content so that the content cannot be reverse engineered and accessed in its plain-version form absent appropriate access mechanisms. In some examples, encryption may be implemented using a mathematical framework or one or more cryptographic algorithms, and an associated cryptographic key or cryptographic key pair. Herein, a cryptographic key may be referred to simply as a "key".

In some examples, decryption includes one or more processes to reverse content encryption to produce its plain-version from its encrypted version. In some examples, decryption may be performed using the same key(s) that were used to encrypt the content. In some examples, decryption may be performed using different key(s) than were used to encrypt the content.

In some examples, a transmission channel includes a communication channel (or simply, "channel") over which information may be transmitted between a sender and a recipient. No particular physical structure is required or implied by a channel. Rather a channel can include any appropriate medium or media, whether wired or wireless, over which information can be moved from one place to another. Such information may include any appropriate digital content such as, but not limited to, electronic mail (e-mail), simple message service (SMS or text) messages, social media or other Web content, and so forth. For example, two different e-mail providers may represent, and use, two different channels (since messages are routed through different servers and along different pathways). For example, two different storage providers may be on and/or represent different channels.

The cloud includes, but is not limited to, computing systems that are external to a user or device, and that may offer services to process data, store data, and/or transmit data. For example, the cloud may include, and be implemented using, a network of computers (e.g., servers and/or other types of processing devices), which may be accessible over one or public and/or private networks (e.g., the Internet and/or one or more intranets). Different computers in the cloud may perform different functions or the functions performed by different computers may be duplicated. For example, some computers may use computing resources to run applications or to deliver services, whereas other computers may perform other functions, such as data storage, load balancing, communications, network routing, and so forth. The cloud is typically accessible from any device through connection to a network. Computers or devices in the cloud can store a user's content temporarily or persistently, and can be used to implement channels. For example, some computers in the cloud may support a first e-mail service, whereas other computers in the cloud may support a second, different e-mail service.

One or more computers in the cloud may also be used to implement key providers. In example implementations described herein, the key providers are different from the entities used to support the channels. One or more computers in the cloud may also be used to implement privacy service providers. A privacy service provider includes any entity that provides or supports one or more services, such as those described herein, to promote private transmission of content. In some implementations, a privacy service provider requires that its clients be authenticated (abbreviated "auth") using one more appropriate mechanisms, such as a password. In this regard, authentication includes confirming that a party is who they claim to be and, once authenticated, is allowed to perform some action. For example, a content recipient is authenticated and, if authorized, may access some service.

In some examples, physical separation includes isolation of data through physical, rather than digital, mechanisms. An example of physical separation includes, but is not limited to, employing two or more different service providers to service (e.g., transmit, store, process, forward, or otherwise handle) different data (e.g., different content fragments). An example of physical separation includes, but is not limited to, employing virtualized environments, such as in data centers, that serve multiple service providers and that maintain data isolation among customers of those service providers using virtual machines.

Software vulnerabilities are examples of defects in electronic devices that may be exploited by malicious third parties. Computer systems are used as examples herein, but the example processes described may be used with any appropriate electronic device. Examples of electronic devices include, but are not limited to, various forms of digital computers, examples of which include laptops, desktops, workstations, personal digital assistants, servers, blade servers, mainframes, and other appropriate computers. Examples of electronic devices also include, but are not limited to, various forms of mobile devices, examples of which include personal digital assistants, cellular telephones, smartphones, and other similar computing devices. Electronic devices, their connections and relationships, and their functions, examples of which are described herein, are meant to be illustrative only, and are not meant to limit implementations of the technology described and/or claimed in this document.

Computer systems may be manipulated in ways that are unforeseen at design-time. For example, some systems may leak information or be vulnerable to control by an attacker (e.g., a computer hacker or other unauthorized party or system, including foreign governments). Also, due to system reliance on external data (e.g., user input, network traffic, external sensors, etc.) and the complex nature of some computer systems, in some cases, it may not be possible to address all potential vulnerabilities at design time, ultimately leaving the computer system vulnerable to post-deployment exploitation. The example processes described herein may be used to promote privacy of digital content by employing digital security techniques in conjunction with physical separation. As described herein, in some cases, physical separation alone is used, absent encryption.

In some implementations, physical separation may be achieved by breaking-up content and/or associated artifacts (e.g., encryption keys) and associating the resulting content fragments with physically-separate entities. Physical separation, such as this, may be combined with digital security measures, such as encryption, to support content privacy. An example implementation includes content output from a user (sender) device that is to be accessed by other designated users, and which passes through one or more computer systems in the cloud on the way to its destination(s). In some implementations both physical separation and digital security measures may be employed to support privacy of the content on the path between the sender's device and one or more recipient devices.

In some implementations, the content is broken-up or split numerous ways in a client or proxy to produce multiple (e.g., two or more) fragments. The split may be bit-wise or by any other appropriate methodology or granularity. In some implementations, each fragment is encrypted using a different session key that is unique and generated in the sender's device. In some implementations, a session key expires after a single use, where a use includes encrypting content and decrypting the encrypted content. Each encrypted fragment may be part of a separate message and include a separate session key that is used to encrypt another fragment in another message or in the same message. The session keys can also be encrypted using a key (or other non-key information) provided by a privacy service provider or by multiple such providers. The e-mail messages may be sent using separate service providers supported by both the sender and recipient computer systems. The destination address may be translated into two destination physical e-mail addresses by a proxy and the privacy service. This example assumes the recipient device uses the same privacy service as the sender. However, this is not a requirement.

As part of communication between a sender (e.g., a device, system, etc.) and a recipient (e.g., a device, system, etc.), content fragments may be reassembled at the recipient following proper authentication. For example, a recipient may be authenticated with a key provider in order to obtain one or more keys to decrypt the received fragments. Each key provider may support its own kind of authentication. For example, authentication may be implemented via a password or other appropriate mechanism(s). Following authentication, the recipient receives the appropriate key or keys needed to decrypt the fragments. The fragments are decrypted using the received key(s), and the recipient reassembles the fragments in their proper order/location following decryption to thereby reconstruct the content.

As noted, in some implementations, separate content fragments can be transmitted over separate channels, thereby achieving physical isolation of those fragments. Individual fragments may be encrypted using one-time session keys generated in the sender's device. Those individual session keys may be transmitted with different fragments. For example, key1 used to encrypt fragment1 may be transmitted with fragment2, and key2 used to encrypt fragment2 may be transmitted with fragment1 (where the indicia "1" and "2" signify different keys and fragments). Fragment1, key2 may be transmitted over a first physical channel (e.g., via a first e-mail provider or stored at a first service provider), and fragment2, key1 may be transmitted over a second physical channel (e.g., via a second e-mail provider or stored at a second service provider).

As noted, the session keys may also be encrypted using one or more keys from one or more different key providers or privacy service providers. The sender may request, and receive, the key(s) for encryption from one or more key providers following proper authentication. The recipient may request, and receive, the key(s) for decryption from one or more key providers following proper authentication. The one or more key providers may be different systems (e.g., different service providers) than the first and second e-mail providers. In the above example, keyA from providerA may be used to encrypt key2 (of fragment1, key2 pair); and keyB from providerB may be used to encrypt key1 (of fragment2, key1 pair), where providerA and providerB are different key providers and are unaffiliated with the services (e.g., e-mail providers, cloud storage, or other services) used to implement the different channels. The sender and recipient may obtain keyA from providerA and keyB from providerB upon appropriate authentication. In some implementations, keyA and keyB are provided by a single key provider or different key providers, and the single key provider or different key providers are different from the channel (e.g., e-mail) providers used to transmit keyA and keyB (e.g., for keyA, different key and channel service providers are used; for keyB, different key and channel service providers are used; and the key and channel service providers for keyA are different from the key and channel service providers for keyB).

In some implementations, authentication ensures that a message and/or the recipient of that message comport with the sender's original intent and/or that only a sender-chosen destination system or systems can access encrypted content in its plain-version form. In the cloud, e.g., in a computer system outside of the sender's computer system, encrypted content that is part of the message is stored in its encrypted version only. Consequently, no single party or system involved in content transmission or storage, e.g., in providing individual keys, authentication, channels, and/or cloud services, can decrypt the content without access to the proper keys used for decryption. This is typically the case even if such a party or system is able to access the encrypted content. Generally, the only single parties with access will be the sender, the recipient, or an entity with legal access.

In some implementations, no single party, other than the sender and intended recipient, includes all that is needed (e.g., encrypted content fragments, key(s) for decrypting content fragment(s), and so forth) to access a plain-version of the content and thereby compromise data privacy. That is, in some implementations, the content is protected through both digital security (encryption) and physical separation. Even if the encryption is overcome, due to the physical separation, at worst an attacker can only access a fraction of the original content (e.g., a scrambled collection of bits). This is because the attacker will only have access to a content fragment from a physical channel, and not all content fragments or key(s) for all of the content. This may also be true if no digital security is used; that is, if protection is achieved only through physical separation. In this example, a service provider (e.g., an e-mail provider, a cloud storage provider, and so forth) may have access to a collection of bits that do not represent all of the content). The benefits of physical separation alone can be improved by using a larger number of service providers for physical separation. This may include separating the content into larger numbers of fragments, using more service providers (e.g., physical separation) for the transmission, storage, forwarding, etc. of the fragments.

In some implementations, physical separation can be used to separate encrypted content from its keys and other artifacts instead of separation based on fragmentation of content. For example, key1 used to encrypt content1 may be transmitted with content2, and key2 used to encrypt content2 may be transmitted with content1 (where the indicia "1" and "2" signify different keys and content). In this example, key1 and key2 are session keys generated at the sender device. Key1, content2 may be transmitted over a different channel than key2, content1. In this example, the session keys are not themselves encrypted; however, in other examples described here, the session keys may be encrypted.

As described above, in some implementations, content may be broken-up or split into multiple fragments of the same or different size at the sender device, and in some cases the content is not broken-up. The following description applies both to fragments and non-broken content, although fragments are used as an example. The fragments are then encrypted using one-time session keys that are also transmitted. A transmitted key is physically separated from its corresponding fragment. The transmitted session keys themselves can be also encrypted by an authentication/authorization party, or by another party, and recovered at the destination after successful authentication. For example, key1 used to encrypt fragment1 may be transmitted with fragment2, and key2 used to encrypt fragment2 may be transmitted with fragment1 (where the indicia "1" and "2" signify different keys and fragment). In this example, key1 and key2 are session keys generated at the sender device. Key1, fragment2 may be transmitted over a different channel than key2, fragment1. In an example, keyA from providerA may be used to encrypt/decrypt key2; and keyB from providerB may be used to encrypt/decrypt key1, where providerA and providerB are different key providers and are unaffiliated with the services (e.g., e-mail providers, cloud storage, or other services) used to implement the different channels. The sender and recipient may obtain keyA from providerA and keyB from providerB upon appropriate authentication.

Accordingly, in some implementations, the sender (e.g., the content owner) and designated recipient(s) are enabled access to the plain-version of the content. But, on the end-to-end path between the sender and the recipient(s), including in the cloud, the content is protected by, e.g., (i) encryption of content and physical separation of the keys used to encrypt the content, (ii) encryption of content fragments and physical separation of the fragments on different channels for transmission, with unencrypted keys for decrypting the content fragments also being physically separated from the content fragments during transmission, (iii) encryption of content fragments and physical separation thereof on different channels for transmission, with encrypted keys for decrypting the content fragments also being physically separated from the content fragments, and with keys to decrypt the encrypted keys being available from a third party key provider, or (iv) physical separation of fragments alone. Different types of authentication may also be employed. In some implementations, two or more the following may be combined in any appropriate manner to secure data: digital security, obfuscation, fragmentation, bit-permutations in fragments, and physical separation.

In some implementations, the degree of physical separation, digital security, and authentication methods affect the amount of security. In some implementations, at a minimum, depending on privacy resilience requirements, two-way physical separation is employed. For example, with two-way separation and encryption using encrypted fragment keys, multiple (e.g., two) content fragments and keys for decrypting those content fragments are isolated. Each fragment of content is encrypted using unique session keys that are also physically separated from each other and their associated fragments. Using a separate key-providing party, a session key created in a sender's device could be embedded encrypted by the provider's key. Fragment keys are embedded physically separated from their corresponding fragment. In examples, key1 used to encrypt fragment1 may be transmitted with fragment2, and key2 used to encrypt fragment2 may be transmitted with fragment1; the key1, fragment2 and key2, fragment1 combinations may be transmitted over the same or separate channels; and the key1, fragment2 and key2, fragment1 combinations may be encrypted using the same or different keys from the same or different key providers (e.g., providerA and providerB).

As noted herein, the example processes may be used to secure data associated with any appropriate applications including, but not limited to, e-mail, cloud storage, text messages, and public and private social networks.

In some implementations, different (e.g., two or more) e-mail providers may be used to send different content fragments, either encrypted or not, and thereby provide additional privacy/protection. In such implementations, the sender and receiver devices may execute corresponding software or utilize proxy software and existing e-mail client software to support sending and receiving e-mail from the different providers. In some implementations, different e-mail addresses can be used. In some implementations, an alias to a physical address of the user's device is implemented instead, e.g., though translation via a proxy and e-mail service.

In some implementations, the e-mail is broken in the client or proxy into multiple (e.g., two or more) fragments. The split may be bit-wise or by any other appropriate methodology. In some implementations, each fragment is encrypted using a different session key that is unique and generated in the sender's device. Each encrypted fragment may be part of a separate message and include a separate key that is used to encrypt another fragment in another message or in the same message. The fragment keys can also be encrypted using a key provided by a privacy service provider or by multiple such providers. The e-mail messages are sent using separate service providers supported by both the sender and recipient computer systems. The destination address may be translated into two destination physical e-mail addresses by a proxy and the privacy service. This example assumes the recipient device uses the same privacy service as the sender. However, this is not a requirement. In examples, key1 used to encrypt fragment1 may be transmitted with fragment2, and key2 used to encrypt fragment2 may be transmitted with fragment1; the key1, fragment2 and key2, fragment1 combinations may be transmitted using the same or separate e-mail providers or cloud storage providers; and the key1, fragment2 and key2, fragment1 combinations may be encrypted using the same or different keys from the same or different key providers. The sender and recipient may obtain keyA from providerA and keyB from providerB upon appropriate authentication.

In some implementations, the destination e-mail address is translated into two destination physical e-mail addresses by the proxy and a privacy service. One or more of the fragments is sent to one of the destination e-mail addresses and one or more of the fragments is sent to another of the destination e-mail addresses. This example assumes that the sender and destination subscribe to the same privacy service; however, this is not a requirement. Physical separation can be also implemented without using an e-mail address, but rather through emulating transmission using a storage provider between sender and receiver.

Content fragments remain encrypted at the sender's e-mail outbox and destination's IMAP/POP server(s). The recipient device's proxy decrypts and reassembles the fragments into a plain-version message following authentication with the privacy service provider, as described herein (e.g., through password input). The e-mail client at the destination receives the reconstructed e-mail through the proxy. In some implementations, this decryption and assembly are performed every time e-mail is accessed. Legal access may be obtained through cooperation of, e.g., the destination's e-mail provider(s) and the privacy service provider.

In some implementations, a key from a privacy service provider is used instead of different channels or different storage providers. In such implementations, a service-provider supplied key may be used encrypt a session-key generated in a proxy device. Content may be stored in the cloud and encrypted using the session key. The encrypted session key may be stored together with the content.

In some implementations, such as private social networks, cloud-based social network content may be made accessible to designated members only (e.g., only to a subset of members of the social network). For example, each user may be part of a privacy circle comprised of members with whom content, or a subset of content, is shared. In an example, the owner of a content uploads the content to the private social network. A session key is used to encrypt the content, and a privacy service provides an encryption key that is used to encrypt the session key in the manner described herein. When a designated user accesses content, e.g., through a Web application or dedicated software, content is presented if that user is in the content owners privacy circle and, therefore, has access to the encryption key that is used to decrypt the session key. Access to the content by third parties (e.g., government agencies) may require cooperation from both the storage provider and the privacy service provider.

In some implementations, different (e.g., two or more) cloud storage or other cloud service providers may use, support, or define different (e.g., two or more) channels. Similar to the e-mail example described herein, content may be segmented into fragments and those fragments may be encrypted by proxy software or equivalent embedded functionality running in the sender's device or another appropriate device. In this regard, in some implementations, proxy software may be embedded into the client software, and in some implementations, proxy software may be outside of the main client software. In some implementations, access (e.g., access to links) to the content may require proper authentication with a privacy service provider and access to the content fragments sent by the sender. In some implementations, the recipient proxy reassembles the content on-the-fly (e.g., in real-time), serially as each fragment is decrypted, as appropriate. In such implementations, a key may not be needed from the privacy service provider, since content is fragmented and is stored with session keys that are not used for content in the same channel/provider. In some implementations, the privacy service may use a key pool and generate a user-content specific key, for example, by mixing with an owner-specific secret key, a randomly-selected pool key. This key is then used to encrypt the fragment keys. This key could be identified using a tag that may be embedded in the stored content or split across the fragments. Access by third parties, such as government agencies, may require access to the encrypted fragments with the cloud storage providers and possibly the privacy service provider. The user's privacy circle could be updated to remove a right to access its social content by a member or add new members.

FIG. 1 shows an example system that employs multi-way (e.g., two or more-way) physical separation (e.g., content fragments are generated, and transmitted unencrypted over multiple, different physical channels). For example, in some implementations, to maintain physical isolation, at least two content fragments are transmitted over two different channels; or at least three content fragments are transmitted over three different channels; or at least four content fragments are transmitted over four different channels; or at least five content fragments are transmitted over five different channels; or at least six content fragments are transmitted over six different channels; and so forth.

In the example of FIG. 1, content 2 ("C") in device 1 (e.g., a computer system) is to be shared with device 14 (e.g., a computer system). To this end, device 1 is configured to send content 2 to device 14 via cloud 7. In some implementations, the sender is authenticated using provider 16, which implements a privacy service. For authentication, a user may be required to input a password and/or other identifying indicia into provider 16 comprised of one or computing devices. In this example, the sender and recipient may each be authenticated with provider 16 to identify that multiple transmissions comprise fragments on different channels. The provider may identify the fragments, channels, etc., and provide appropriate information to the sender and/or the recipient, which is used to split the content into fragments, to send the content over appropriate channels as fragments, and to reassemble the fragments. For example, the authentication may include providing data explaining how to break the content into fragments, which channels to transmit the data over, and how to reassemble received content fragments. The sender (device 1) and recipient (device 14) may also be authenticated with e-mail service providers 10 and 11 in order to send and receive the fragments/content. For example, the sender and recipient may have to input a username and password in to each separate e-mail service provider to send or receive the content (e.g., encrypted or unencrypted content and/or keys) transmitted via that provider.

For example, after authentication, device 1 breaks content 2 into fragments F1 8, F2 9 (or more than the two shown), as described herein. Fragments F1 and F2 may be stored and/or transmitted by provider1 11 and provider2 10 (e.g., e-mail service providers, cloud storage service providers, or the like) along routes 5 and 6 through cloud 7. In some implementations, fragments F1, F2 are not encrypted, in which case enhanced privacy is achieved through physical separation.

Before transmission, the sender may be authenticated with both providers 10, 11. In this example, storage and/or transmission routes are physically separated. Device 14 (the recipient) may be configured to receive the content fragments, and to reassemble the fragments to produce content 15 (which is the same as content 2 if reassembly occurs properly). In some implementations, device 14 may request, and receive, authentication via providers 10, 11. For example, device 14 may require authorization from provider 16 to receive fragments F1, F2 in unencrypted form and/or or require authorization from providers 10, 11 to receive fragments F1, F1 in unencrypted form. In some implementations, users of computer systems 1, 14 may be subscribers to a privacy service provided by provider 16. In some implementations, transmission may be over secure channels, such as SSL, which may be accessible only following authentication with appropriate provider(s). Information obtained by authentication with provider 16 may be used to reassemble the content fragments, for example.

Figure 2:
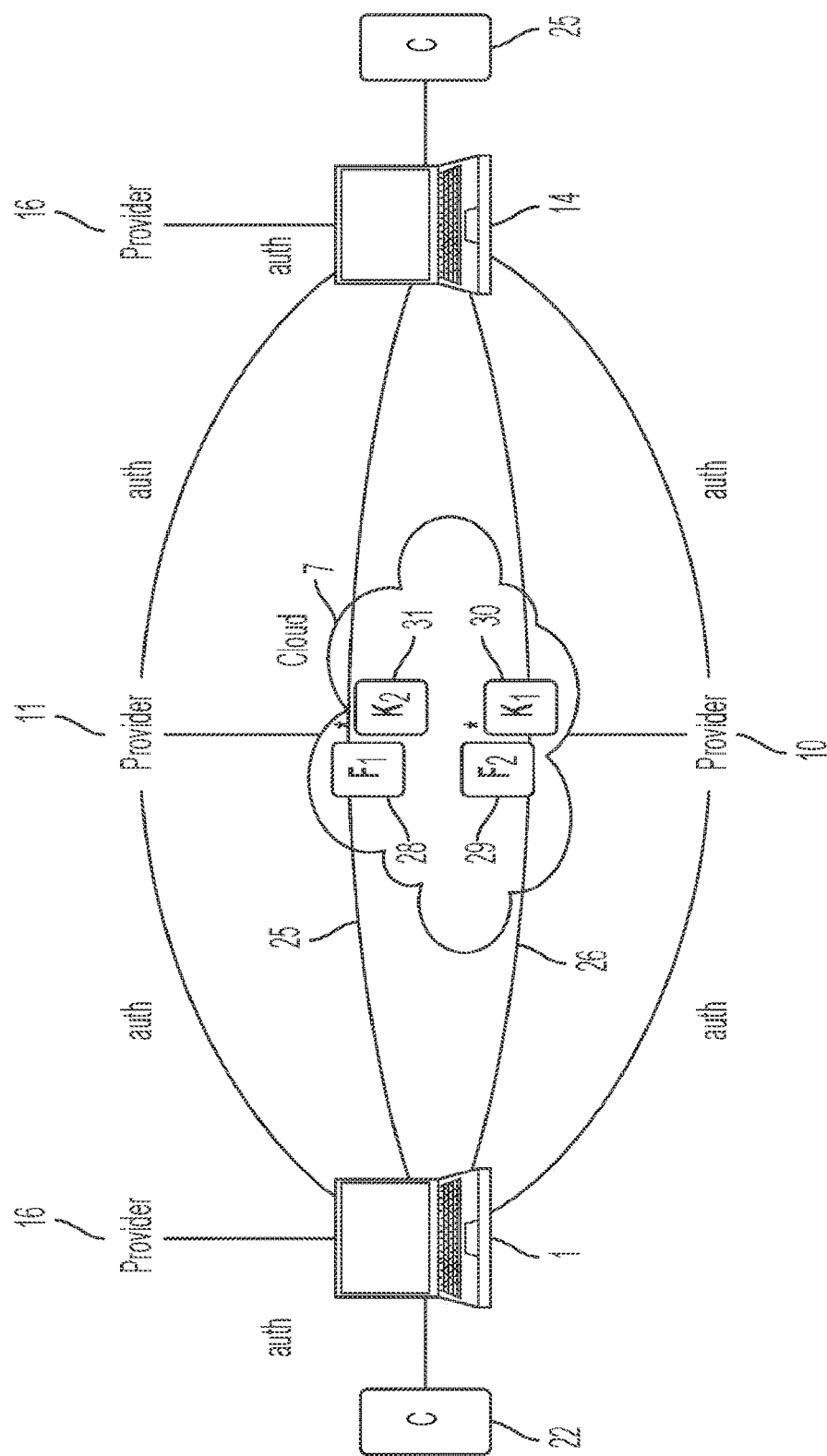
FIG. 2 is block diagram of an example system for transmitting content fragments that are physically isolated and encrypted.

FIG. 2 shows an example system that employs multi-way (e.g., two or more-way) physical separation with encryption (e.g., content fragments are generated, encrypted, and transmitted over multiple, different physical channels). Device 1 breaks content ("C") 22 into fragments F1 28, F2 29 (or more than the two shown), as described herein. Fragments F1 and F2 may be stored and/or transmitted by provider 11 and provider 10 along routes 25 and 26. In this example, fragments 28 and 29 of FIG. 2 are encrypted using unique session keys K1 30 and K2 31, respectively, which were generated by device 1. These keys K1 30 and K2 31 are embedded in fragments F1 29 and F2 28, respectively, which is depicted by in the figures by the close proximity of the fragments and keys. In this example, the session key used to encrypt fragment F1 28 is embedded with fragment F2 29, and the session key utilized to encrypt fragment F2 29 is embedded with fragment F1 28. In this example, the session keys themselves are not encrypted.

Device 14 receives the encrypted fragments F1 28 and F2 29 and associated session keys. After appropriate authentication by device 14 with e-mail service providers 10, 11 and with privacy service provider 16 (where the authentication ("auth") may be as described above with respect to FIG. 1), the session keys are extracted from the fragments. The extracted session keys are used to decrypt the fragments, and the content is reconstructed by combining the fragments using one or more appropriate processes. The result, content 25, will be the same as original content 22. The information received from the provider following authentication may enable sending and receiving of the fragments over appropriate secure channels, may enable splitting the content into fragments, may enable reassembly of the fragments to produce the content, and so forth.

FIG. 2 is an example of the case where key1 used to encrypt fragment1 is transmitted with fragment2, and key2 used to encrypt fragment2 is transmitted with fragment1 (where the indicia "1" and "2" signify different keys and fragments). Key1, fragment2 are transmitted over a different channel than key2, fragment1. At the recipient, the keys are extracted from the fragments, and used to decrypt the appropriate fragments. That is, key1 is extracted from fragment2 and used to decrypt fragment1; and key2 is extracted from fragment1 and used to decrypt fragment2. In this example, key1 and key2 are not themselves encrypted.

Figure 3:
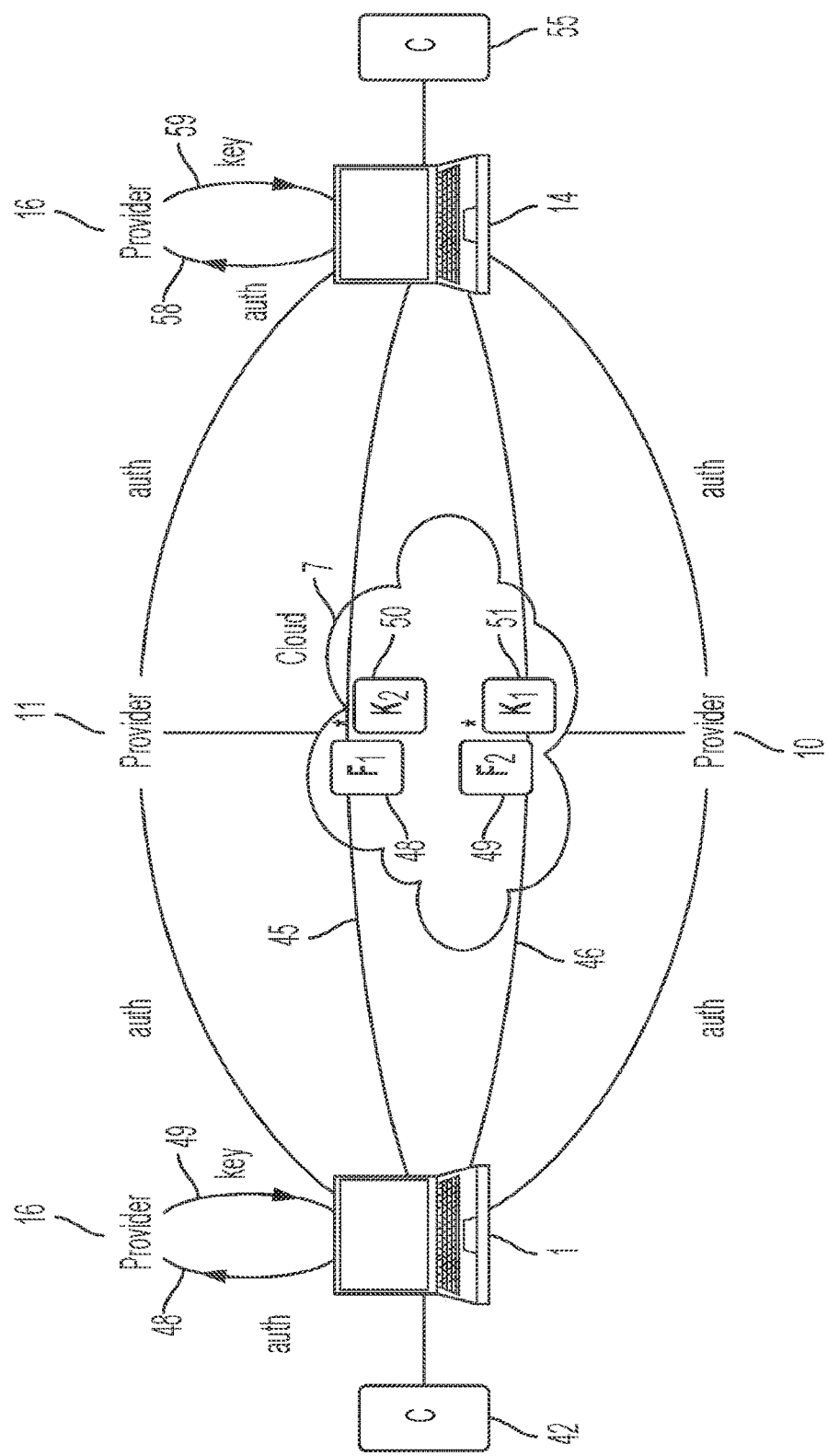
FIG. 3 is block diagram of another example system for transmitting content fragments that are physically isolated and encrypted.

Referring to FIG. 3, in this example, device 1 is configured to send content ("C") 42 to device 14 for access by device 14 only. In this example, a user/device sending content 42 is authenticated by an external key provider 16, which is the same as the privacy service provider of FIG. 1 in this example, but need not be (e.g., by sending a password 48 to the provider). The user/device 1 is also authenticated with e-mail service providers 10, 11 in the manner described with respect to FIG. 1.

Following authentication with key service provider 16, device 1 receives a key 49 that is usable for encryption. In some implementations, multiple keys from one or more key providers may be used for encryption, as described herein. That same key provider or key providers may ensure that only the correct destination device can access that key(s) (e.g., by requiring a password from that device) and that the key(s) can only be used for that particular content 1. Device 1 also generates session keys internally. The session keys expire after a single use. In this example, device 1 splits content ("C") 42 into multiple (e.g., two or more) fragments. For example, the content may be split bit-wise or in any other appropriate manner. The resulting fragments are then encrypted using the session keys. The session keys (K2 50 and K1 51) are themselves encrypted using key 49, which was obtained from key service provider 16 following authentication 48. In some implementations, the resulting encrypted keys are embedded into messages for different fragments, along with an indication as to which fragment the encrypted keys are for (e.g., a session key 51 to encrypt fragment 48 may be embedded in fragment 49, and a session key 50 to encrypt fragment 49 may be embedded in fragment 48). In some implementations, the resulting encrypted keys are embedded into the corresponding message for each fragment.

In some implementations, resulting encrypted fragments 48 and 49 are each sent over a different channel, e.g., channels 45 and 46, respectively, which pass through cloud 7 on the path to the content's destination, here device 14. In cloud 7, the two encrypted fragments 48 and 49 are serviced (e.g., transmitted/forwarded, stored, or otherwise processed) by two separate providers 10 and 11, respectively) and may be stored in their encrypted versions (in the cloud or elsewhere) before being sent to device 14. Following receipt of the encrypted fragments at device 14, the recipient/device is authenticated by the key provider 16 using appropriate password(s) 58. The recipient device receives key 59 from the key provider. Key 59 may be the same as, or different from, the key that was used to encrypt keys 50 and 51. Key 59 is used by device 14 to decrypt keys 50 and 51. Keys 50 and 51 are used by device 14 to decrypt their corresponding fragments, whereafter the decrypted fragments are reassembled to produce the original content ("C") 55 that was transmitted from the sender's device. Content 55 is, following reassembly, the same as content 42, assuming no or few transmission errors.

Figure 4:
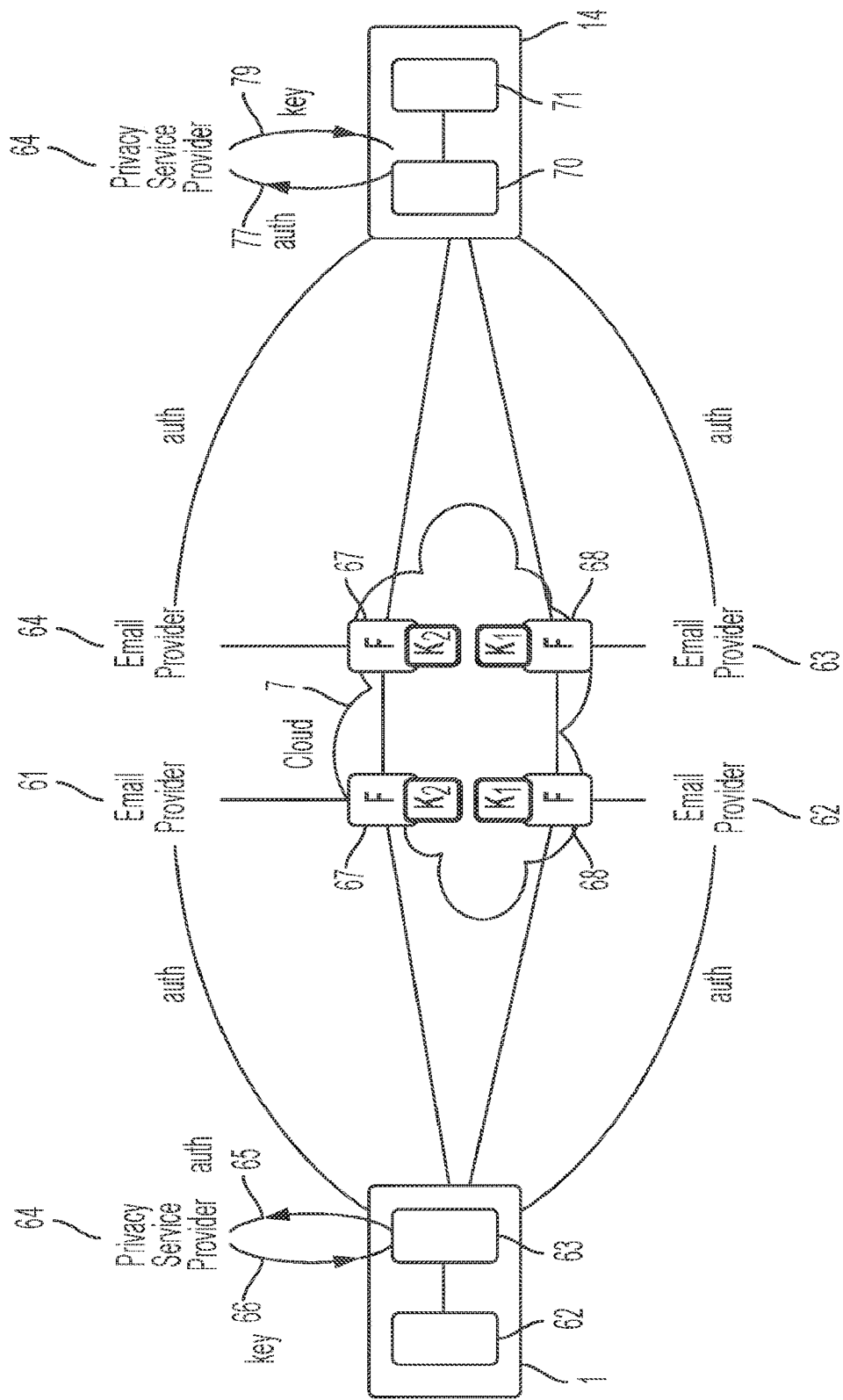
FIG. 4 is block diagram of an example system for transmitting content fragments using different message service providers.

The example of FIG. 4 employs different e-mail providers to physically separate, during transmission, content fragments, which may be encrypted or not, as described above with respect to FIGS. 1 to 3. In this example, multiple (e.g., two or more) e-mail service providers 61, 64 (and e-mail service providers 62, 63) are physically separated (e.g., are not the same e-mail service provider). An e-mail client 62 in device 1 is configured to send a private message from one private e-mail address to another private e-mail address. In this version, the private e-mail address is established in client software 62, using servers pointing to a local host. This is one way to connect a proxy 63 with client e-mail software 62. The e-mail message is split into fragments by proxy 63 after the sender is authenticated (65) with privacy service provider 64 (which may be the same as, or different from, the privacy service providers described with respect to FIGS. 1 to 3). Key 66 is delivered by provider 63 to device 1 following authentication 65 of the corresponding user/device 1. Fragments 67, 68 of content are encrypted, and sent to two or more physical e-mail addresses that were recorded by the privacy service provider for the destination. In some implementations, the fragments are encrypted using session keys as described herein; the session keys are encrypted using key 66, and the resulting encrypted session keys are transmitted with different fragments (e.g., key1—K1—used to encrypt fragment 67 may be transmitted with fragment 68, and key2—K2—used to encrypt fragment 68 may be transmitted with fragment 67).

In some implementations, sending the fragments may require authentication with SMTP servers of e-mail providers 61 and 62. The e-mail messages with fragments and encrypted keys may be saved in "send" folders for e-mail service providers 61 and 62, which are located in the cloud as shown in FIG. 4. These e-mail messages may be obtained, following appropriate authentication and correspondence with their provider counterparts, and relayed to separate e-mail service providers 63 and 64, and then fetched by proxy 70 in device 14. The session keys may be decrypted are using key 79 after device 14 is successfully authenticated (77) by provider 64, as described herein. Fragments may be decrypted using their appropriate decrypted corresponding session keys, as described herein. Fragments are then combined into original content in proxy 70, as described herein. The resulting e-mail appears as a regular e-mail at client software 71 in recipient 14.

In the example implementation of FIG. 4, the sender/sender device, the message content, and the recipient/destination device may be authenticated with the various e-mail service providers and with the privacy service provider, as described herein with respect to FIGS. 1 to 3.

Figure 5:
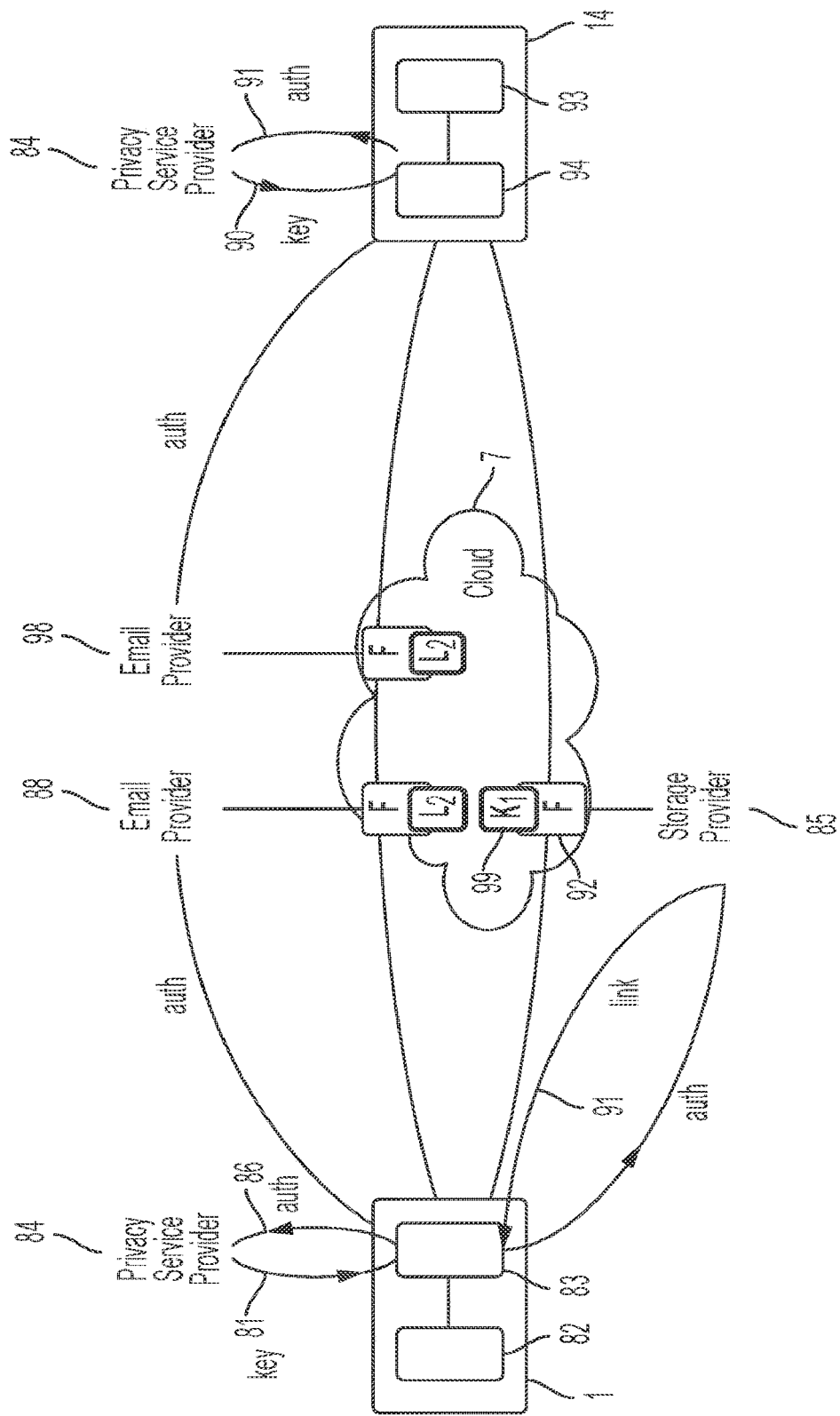
FIG. 5 is block diagram of an example system for transmitting content fragments using different cloud storage service providers.

FIG. 5 shows an example implementation in which, instead of using two physical e-mail addresses to achieve physical separation of content fragments, a physical e-mail address (provided, e.g., by an e-mail service provider) and a physical storage link (provided, e.g., by a cloud storage service provider) are used to achieve physical separation. The link can be implemented in different ways. An example is a URL (Uniform Resource Locator). In this example, a privacy virtual address (e.g., a virtual e-mail address that is known to a proxy but not physically implemented) is decomposed into a physical e-mail access and a physical storage access. The physical storage access may be identified using a link, such as a URL. The e-mail access uses e-mail provider 88 as the sender and e-mail provider 98 as the destination, both in the cloud. In the cloud, provider 88 relays content to provider 98 in accordance with e-mail protocol. The storage link provided by provider 85 is inside the e-mail, along with a content fragment. The link is encrypted but, after decryption in the destination, the link serves the purpose of enabling access to another fragment stored with the storage provider 85, thereby replacing fetching of a second e-mail as was used in the case with two e-mail channels in FIG. 4.

A further example operation is as follows. Device 1 includes client software 82 and privacy proxy 83. Device 1 is authenticated (86) by privacy service provider 84 (which may be the same as, or different from, the privacy service providers described with respect to FIGS. 1 to 4) using any appropriate method, and obtains key 81. Content fragments, which may be generated as described herein, are obtained from an original e-mail message in device 1. A fragment is then sent via e-mail to the destination, here device 14. Another fragment is stored in, and accessible via link 91, at a location in cloud service provider 85. An e-mail from device 1 to device 14 contains both an encrypted link 91 (encrypted by key 81) along with one or more of the fragment(s), encrypted or not.

Destination device 14 receives this e-mail from the sender device, and uses information therefrom to reassemble the original content in proxy 94. For instance, the proxy 94 fetches the e-mail from e-mail service provider 98, and receives key 90 from provider 84 following successful authentication 91. In this example, e-mail service providers 88 and 98 have the same configuration and relationship as e-mail service providers 61 and 64 of FIG. 4. Key 90 is the same as key 81 when symmetric encryption is used. Key 90 is used to decrypt the storage link in the e-mail, thereby allowing access to the second fragment in cloud storage provider 85. That is, following its decryption, the link can be used to obtain content, which may include one or more fragments, either encrypted or non-encrypted. Now that all fragments are accessible, the original content can be reassembled in proxy 94 and forwarded to e-mail client software 93. In some implementations, the fragments are encrypted using unique session keys as described herein; the session keys are encrypted using key 81; and the resulting encrypted session keys are associated with different fragments (e.g., session key1 used to encrypt fragment1 may be stored with fragment2 at storage provider 85, and key2 used to encrypt fragment2 may be transmitted with fragment1 in the e-mail using e-mail providers 88 for the sender and 98 for the destination). In this example, the session keys are used to decrypt the fragments before reassembly in proxy 94. In other examples, proxy 94 functionality is directly embedded in client software 93.

In some implementations, the e-mail message content is divided into fragments to be stored in computer memory managed by content storage provider 85. In some implementations, the cloud storage service provider 85 sends e-mail messages containing links to stored fragments to one or more physical e-mail addresses of the destination. The recipient's proxy 94, after authentication by the cloud service provider, fetches fragment(s) 92 and encrypted key(s) 99. Key(s) 99 is decrypted using key 90 (which may be identical to key 85) and the resulting decrypted session key(s) is used to decrypt fragment(s) 92. Following decryption, all fragments are reassembled in accordance with information from the privacy service provider. The reassembled message is forwarded by proxy 94 to client software 93 as a regular e-mail. Client 93 sees proxy 94 as the POP/IMAP e-mail server. This is because the destination private e-mail address points to a local host.

In the example implementation of FIG. 5, the sender/sender device, the message content, and the recipient/destination device may be authenticated with the various e-mail service providers, with the storage service provider 85, and with the privacy service provider, as described herein with respect to FIGS. 1 to 4.

In some implementations, the features described herein may be implemented in a system in which content and keys are transmitted over different, isolated channels. For example, in some implementations, a system may include encrypting content using one or more keys (e.g., session keys) to produce encrypted content. The encrypted content may be sent over a first channel to a recipient; and the one or more keys used to produce the encrypted content may be sent over a second channel to the recipient. The first channel and the second channel may be different and isolated, thereby providing a level of security. In some implementations, content may simply be fragmented and transmitted unencrypted over different, isolated channels. Assuming that the content is broken down into small enough fragments, the ability to recompose the content is limited absent access to all channels (which is unlikely, since many, if not all, are also subjected to some type of security, such as password protection).

In implementations, where content and keys are transmitted over separate channels, the content may be broken-down into multiple fragments as described herein, and different ones of those fragments may be encrypted using different keys to produce encrypted fragments. At least some of the encrypted content (e.g., all or less than all) may be sent over the first channel noted above; and at least some of the different keys (e.g., all or less than all) may be sent over the second channel noted above. In some implementations, each encrypted fragment is sent over a different, isolated channel from the key used to encrypt that fragment. In some implementations, the keys used to encrypt the fragments are session keys generated by the sender device. The session keys may themselves be encrypted, as described herein, using information (e.g., key(s)) from a third party, such as a key provider. That information is accessible to the recipient, e.g., through appropriate authentication procedures. Following receipt of the session keys and encrypted fragments over the different channels, the recipient may obtain the information used to decrypt the session keys from the third party (e.g., obtain one more other keys), decrypt the session keys, identify (e.g., based on information transmitted with each session key and/or fragment) each fragment and associated session key, and decrypt the fragments using appropriate session keys. The fragments may be reassembled in appropriate order as described herein.

In some implementations, where appropriate, each transmission described herein—whether it be for an encrypted or unencrypted session key and for an encrypted or unencrypted fragment—may contain information (e.g., information in an HTTP or e-mail header or other appropriate location) identifying which key(s) are associated with which fragment(s) and also identifying (in the same or a different location) how the fragments fit together (e.g., how they should be reassembled). In some implementations, in order to provide additional security, the sender may send this information to the receiver electronically over one or more channel(s) or may send it in a physical medium (e.g., a disk or USB stick), where the information sent refers to which key(s) are associated with which fragment(s) and also identifies how the fragments fit together (e.g., how they should be reassembled). In some implementations, this information may be available, and obtained from, a third party (such as a third party key provider) following appropriate authentication. Combinations of electronic transmission, physical transmission, or third party authentication may be used, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

All or part of the systems and techniques described herein, as appropriate, can be implemented in one or more computing systems that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing systems can include clients and servers. A client and server are generally remote from each other and typically interact through a communication network. The relationship of client and server arises by virtue of computer programs running on the respective computers and having a client-server relationship to each other.

All processes described herein and variations thereof (referred to as "the processes") may contain functionality to ensure that party privacy is protected. To this end, the processes may be programmed to confirm that a user's membership in a social networking account is publicly known before recommending a connection to that user through the social networking account. Likewise, the processes may be programmed to confirm that information about a party is publicly known before divulging that information to other party, or even before incorporating that information into a social graph. In the context of this disclosure, the terms social network and social networking service may be used interchangeably.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

E-mail is described herein as the transmission mechanism for content. However, any appropriate transmission mechanisms, such as SMS message, instant message, or the like may be used either in substitute for, or in addition to, e-mail where e-mail is described herein.

Other implementations not specifically described herein are also within the scope of the following claims.

What is claimed is:

1. A method performed by an electronic system, comprising:
    breaking electronic content into multiple fragments;
    for a first fragment of the multiple fragments, encrypting the first fragment to produce a first encrypted fragment using a first cryptographic key corresponding to a first encryption;
    for a second fragment of the multiple fragments, encrypting the second fragment to produce a second encrypted fragment using a second cryptographic key corresponding to a second encryption;
    performing an authentication process with a key provider;
    receiving a third cryptographic key based on the authentication process;
    using the third cryptographic key, encrypting the first cryptographic key to produce a first encrypted cryptographic key, and the second cryptographic key to produce a second encrypted cryptographic key; and
    following encrypting using the third cryptographic key, sending the following to a recipient device: (i) the first encrypted fragment and the second encrypted cryptographic key over a first physical channel, and (ii) the second encrypted fragment and the first encrypted cryptographic key over a second physical channel that is different from the first physical channel;
    wherein the first and second physical channels comprise different routes through one or more computer networks; and
    wherein the key provider is different from one or more entities that implement the one or more computer networks.

2. The method of claim 1, further comprising:
    causing one or more encrypted hyperlinks to be sent to the recipient device over at least one of the first or second physical channels, the one or more encrypted hyperlinks comprising one or more encrypted versions of one or more hyperlinks for accessing one or more third fragments of the multiple fragments in computer memory that is accessible to the recipient device over the one or more computer networks.

3. The method of claim 2, wherein causing the one or more encrypted hyperlinks to be sent to the recipient device comprises sending one or more encrypted hyperlinks in one or more electronic communications containing encrypted versions of the one or more third fragments.

4. The method of claim 2, wherein causing the one or more encrypted hyperlinks to be sent to the recipient device comprises sending each of the encrypted hyperlinks in a separate electronic communication, each separate electronic communication also containing a different fragment of the multiple fragments.

5. The method of claim 2, wherein causing the one or more encrypted hyperlinks to be sent to the recipient device comprises causing a storage provider for the computer memory to send one or more messages containing the one or more encrypted hyperlinks to the recipient device.

6. The method of claim 1, wherein the first and second physical channels comprise different mail servers on the one or more computer networks.

7. The method of claim 1, wherein the first and second physical channels comprise different cloud service providers on the one or more computer networks.

8. The method of claim 1, wherein the first cryptographic key and the second cryptographic key are unique cryptographic keys.

9. The method of claim 1, wherein the first encryption comprises one of digital security, obfuscation, fragmentation, or bit-permutations in fragments;
    wherein the second encryption comprises one of digital security, obfuscation, fragmentation, or bit-permutations in fragments; and
    wherein the first encryption is different than the second encryption.

10. The method of claim 1, wherein sending comprises: (i) sending the first encrypted fragment and the second encrypted cryptographic key to a first proxy address associated with the recipient device, and (ii) sending the second encrypted fragment and the first encrypted cryptographic key to a second proxy address associated with the recipient device.

11. The method of claim 1, further comprising:
    sending, to the recipient device, content associated with a tag that identifies which cryptographic key is used to decrypt which encrypted fragment, the content associated with the tag being split and transmitted to the recipient device with the first encrypted fragment and the second encrypted fragment.

12. The method of claim 1, wherein electronic communications are used to send, to the recipient device, the first encrypted fragment, the first encrypted cryptographic key, the second encrypted fragment, and the second encrypted cryptographic key, the electronic communications comprising headers to identify which cryptographic key is used to decrypt which encrypted fragment.

13. The method of claim 12, wherein a header comprises a HyperText Transfer Protocol header.

14. A method performed by an electronic system, comprising:
    receiving a first encrypted fragment and a second encrypted cryptographic key over a first physical channel;
    receiving a second encrypted fragment and a first encrypted cryptographic key over a second physical channel that is different from the first physical channel, each of the first encrypted cryptographic key and the second encrypted cryptographic key having been encrypted using a third cryptographic key;
    performing an authentication process with a key provider to obtain a fourth cryptographic key to undo encryption, by the third cryptographic key, of the first encrypted cryptographic key to obtain the first cryptographic key and of the second encrypted cryptographic key to obtain the second cryptographic key;
    recovering a first fragment by decrypting the first encrypted fragment using the first cryptographic key;
    recovering a second fragment by decrypting the second encrypted fragment using the second cryptographic key; and
    reassembling content using the first fragment and the second fragment;

wherein the first and second physical channels comprise different routes through one or more computer networks; and wherein the key provider is different from one or more entities that implement the one or more computer networks.

15. The method of claim 14, further comprising:

receiving one or more encrypted hyperlinks over at least one of the first or second physical channels, the one or more encrypted hyperlinks comprising one or more encrypted versions of one or more hyperlinks for accessing one or more third fragments of the multiple fragments in computer memory that is accessible to the electronic system over the one or more computer networks.

16. The method of claim 15, wherein receiving the one or more encrypted hyperlinks comprises receiving the one or more encrypted hyperlinks in one or more electronic communications containing encrypted versions of the one or more third fragments.

17. The method of claim 15, wherein receiving the one or more encrypted hyperlinks comprises receiving each of the encrypted hyperlinks in a separate electronic communication, each separate electronic communication also containing a different fragment of the one or more third fragments.

18. The method of claim 15, wherein receiving the one or more encrypted hyperlinks comprises receiving the one or more encrypted hyperlinks from a storage provider for the computer memory.

19. The method of claim 14, wherein the first and second physical channels comprise different mail servers on the one or more computer networks.

20. The method of claim 14, wherein the first and second physical channels comprise different cloud service providers on the one or more computer networks.

21. The method of claim 14, wherein the first cryptographic key and the second cryptographic key are unique cryptographic keys.

22. The method of claim 14, wherein first encryption performed by the first cryptographic key comprises one of digital security, obfuscation, fragmentation, or bit-permutations in fragments;

wherein second encryption performed by the second cryptographic key one of digital security, obfuscation, fragmentation, or bit-permutations in fragments; and wherein the first encryption is different than the second encryption.

23. The method of claim 14, wherein the at least two of the following are received at one or more proxy addresses associated with the electronic system: the first encrypted fragment, the first encrypted cryptographic key, the second encrypted fragment, or the second encrypted cryptographic key.

24. The method of claim 14, further comprising:

receiving content associated with a tag that identifies which cryptographic key is used to decrypt which encrypted fragment, the content associated with the tag being split and received with the first encrypted fragment and the second encrypted fragment.

25. The method of claim 14, wherein electronic communications are used to send, to the electronic system, the first encrypted fragment, the first encrypted cryptographic key, the second encrypted fragment, and the second encrypted cryptographic key, the electronic communications comprising headers to identify which cryptographic key is used to decrypt which encrypted fragment.

26. The method of claim 25, wherein a header comprises a HyperText Transfer Protocol header.

27. One or more non-transitory machine-readable storage media storing instructions that are executable on an electronic system to perform operations comprising:

breaking electronic content into multiple fragments;

for a first fragment of the multiple fragments, encrypting the first fragment to produce a first encrypted fragment using a first cryptographic key corresponding to a first encryption;

for a second fragment of the multiple fragments, encrypting the second fragment to produce a second encrypted fragment using a second cryptographic key corresponding to a second encryption;

performing an authentication process with a key provider;

receiving a third cryptographic key based on the authentication process;

using the third cryptographic key, encrypting the first cryptographic key to produce a first encrypted cryptographic key, and the second cryptographic key to produce a second encrypted cryptographic key; and following encrypting using the third cryptographic key, sending the following to a recipient device: (i) the first encrypted fragment and the second encrypted cryptographic key over a first physical channel, and (ii) the second encrypted fragment and the first encrypted cryptographic key over a second physical channel that is different from the first physical channel;

wherein the first and second physical channels comprise different routes through one or more computer networks; and wherein the key provider is different from one or more entities that implement the one or more computer networks.

28. One or more non-transitory machine-readable storage media storing instructions that are executable on an electronic system to perform operations comprising:

receiving a first encrypted fragment and a second encrypted cryptographic key over a first physical channel;

receiving a second encrypted fragment and a first encrypted cryptographic key over a second physical channel that is different from the first physical channel, each of the first encrypted cryptographic key and the second encrypted cryptographic key having been encrypted using a third cryptographic key;

performing an authentication process with a key provider to obtain a fourth cryptographic key to undo encryption, by the third cryptographic key, of the first encrypted cryptographic key to obtain the first cryptographic key and of the second encrypted cryptographic key to obtain the second cryptographic key;

recovering a first fragment by decrypting the first encrypted fragment using the first cryptographic key;

recovering a second fragment by decrypting the second encrypted fragment using the second cryptographic key; and reassembling content using the first fragment and the second fragment;

wherein the first and second physical channels comprise different routes through one or more computer networks; and wherein the key provider is different from one or more entities that implement the one or more computer networks.

29. A system comprising:
memory storing instructions that are executable; and
one or more processing devices to execute the instructions to perform operations comprising:
  breaking electronic content into multiple fragments;
  for a first fragment of the multiple fragments, encrypting the first fragment to produce a first encrypted fragment using a first cryptographic key corresponding to a first encryption;
  for a second fragment of the multiple fragments, encrypting the second fragment to produce a second encrypted fragment using a second cryptographic key corresponding to a second encryption;
  performing an authentication process with a key provider;
  receiving a third cryptographic key based on the authentication process;
  using the third cryptographic key, encrypting the first cryptographic key to produce a first encrypted cryptographic key, and the second cryptographic key to produce a second encrypted cryptographic key; and
  following encrypting using the third cryptographic key, sending the following to a recipient device: (i) the first encrypted fragment and the second encrypted cryptographic key over a first physical channel, and (ii) the second encrypted fragment and the first encrypted cryptographic key over a second physical channel that is different from the first physical channel;
  wherein the first and second physical channels comprise different routes through one or more computer networks; and
  wherein the key provider is different from one or more entities that implement the one or more computer networks.

30. A system comprising:
memory storing instructions that are executable; and
one or more processing devices to execute the instructions to perform operations comprising:
  receiving a first encrypted fragment and a second encrypted cryptographic key over a first physical channel;
  receiving a second encrypted fragment and a first encrypted cryptographic key over a second physical channel that is different from the first physical channel, each of the first encrypted cryptographic key and the second encrypted cryptographic key having been encrypted using a third cryptographic key;
  performing an authentication process with a key provider to obtain a fourth cryptographic key to undo encryption, by the third cryptographic key, of the first encrypted cryptographic key to obtain the first cryptographic key and of the second encrypted cryptographic key to obtain the second cryptographic key;
  recovering a first fragment by decrypting the first encrypted fragment using the first cryptographic key;
  recovering a second fragment by decrypting the second encrypted fragment using the second cryptographic key; and
  reassembling content using the first fragment and the second fragment;
  wherein the first and second physical channels comprise different routes through one or more computer networks; and
  wherein the key provider is different from one or more entities that implement the one or more computer networks.

* * * * *